United States Patent
Huber et al.

(10) Patent No.: US 7,007,786 B2
(45) Date of Patent: Mar. 7, 2006

(54) CONVEYOR APPARATUS ON A CARGO DECK OF AN AIRCRAFT

(75) Inventors: Thomas Huber, Schliersee (DE); Richard Holzner, Rosenheim (DE)

(73) Assignee: Telair International GmbH, Miesbach (DE)

( * ) Notice: Subject to any disclaimer, the term of this patent is extended or adjusted under 35 U.S.C. 154(b) by 0 days.

(21) Appl. No.: 10/837,737

(22) Filed: May 3, 2004

(65) Prior Publication Data

US 2004/0216982 A1 Nov. 4, 2004

(51) Int. Cl.
*B65G 13/00* (2006.01)
(52) U.S. Cl. .............................. 193/35 MD; 193/35 SS
(58) Field of Classification Search .......... 193/35 MD, 193/35 R, 35 SS; 244/118.1, 137.1
See application file for complete search history.

(56) References Cited

U.S. PATENT DOCUMENTS

| | | | |
|---|---|---|---|
| 3,693,919 A | 9/1972 | Alberti et al. .......... | 248/119 R |
| 4,382,637 A * | 5/1983 | Blackburn et al. ............ | 384/49 |
| 4,696,583 A * | 9/1987 | Gorges ................. | 193/35 MD |
| 4,871,052 A | 10/1989 | Huber ......................... | 193/35 |
| 5,076,412 A * | 12/1991 | Huber .................. | 193/35 MD |
| 5,096,308 A | 3/1992 | Sundseth ...................... | 384/49 |
| 5,358,337 A * | 10/1994 | Codatto ................ | 193/35 MD |
| 5,390,775 A | 2/1995 | Herrick et al. ............ | 193/35 R |
| 6,051,133 A | 4/2000 | Huber et al. ................. | 210/171 |
| 6,068,214 A | 5/2000 | Kook et al. .............. | 244/118.1 |
| 6,279,716 B1 * | 8/2001 | Kayatani et al. ........ | 193/35 MD |

FOREIGN PATENT DOCUMENTS

| | | |
|---|---|---|
| DE | 34 21 345 A1 | 12/1985 |
| DE | 38 05 494 A1 | 8/1989 |
| DE | 39 41 906 A1 | 6/1991 |
| DE | 197 56 882 A1 | 7/1998 |
| DE | 197 24 941 A1 | 12/1998 |

* cited by examiner

Primary Examiner—James R. Bidwell
(74) Attorney, Agent, or Firm—Marshall, Gerstein & Borun LLP

(57) ABSTRACT

Some known types of conveyor apparatus on a cargo deck of an aircraft comprise roller tracks with a U-shaped cross section that are attached to or on the cargo deck, as well as ball units attached to the roller tracks. In order to enable simple and reversible attachment combined with great durability, it is proposed that holder frames be provided, in each of which one or more ball units are attached, and that can in turn be attached to or in the roller tracks. Locking elements are provided with which to fix the holder frames releasably to the roller tracks.

12 Claims, 3 Drawing Sheets

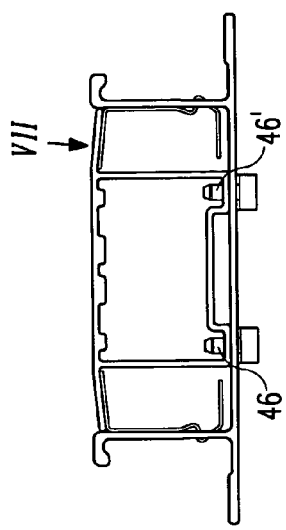
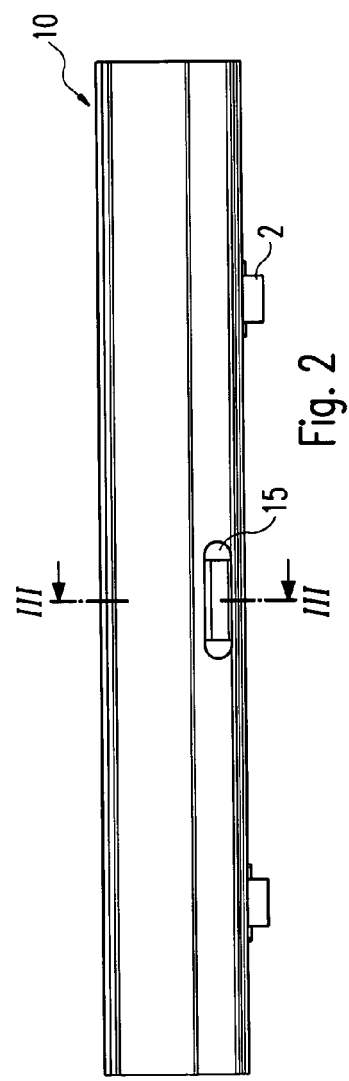
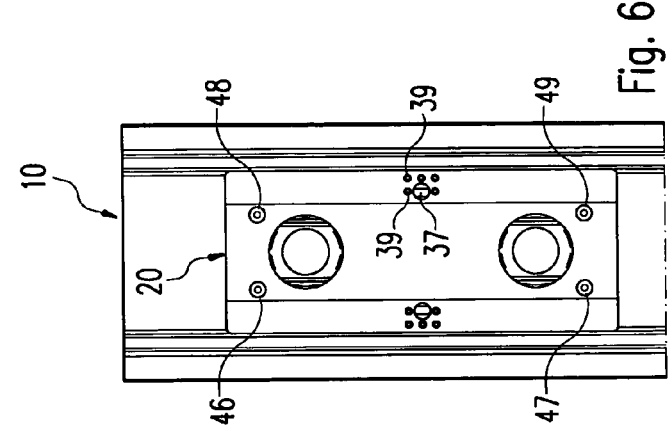
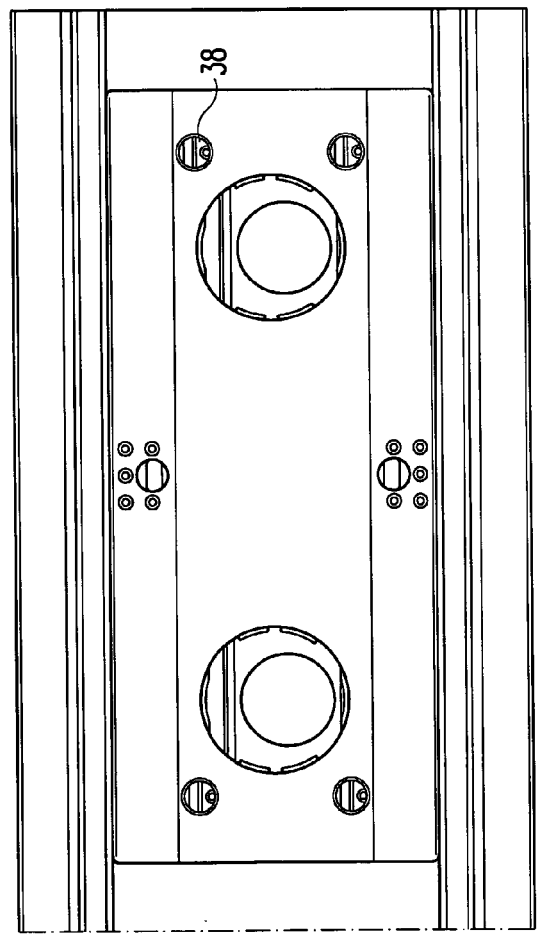

CONVEYOR APPARATUS ON A CARGO DECK OF AN AIRCRAFT

FIELD OF THE INVENTION

The invention relates to a conveyor apparatus on a cargo deck of an aircraft.

BACKGROUND OF THE INVENTION

In aircraft that contain a cargo deck, in particular in the case of the 'Airbus', roller tracks are installed on said deck in which are, or can be, installed rollers and power drive units (PDUs) to drive them. On these conveyors objects, in particular pallets or containers, can be transported in the lengthwise direction of the roller track.

In order to enable the objects to be transported in a direction other than the lengthwise direction of the roller track, ball units are installed on the cargo deck. In particular, to date the equipment used for this purpose comprises plate segments in which the ball units are hung, and which are screwed in so as to be suspended in the roller tracks. This arrangement is disadvantageous insofar as much effort is needed to attach the plate segments, and the ball units can support only relatively small loads. Moreover, with this kind of assembly there are also relatively large gaps between the segments.

BRIEF SUMMARY OF THE INVENTION

It is the object of the present invention to provide a conveyor apparatus on a cargo deck of an aircraft that is set up in such a way as to produce an arrangement of ball units that can support large loads while being simple to assemble and disassemble.

According to the present invention there is provided a conveyor apparatus on a cargo deck of an aircraft, comprising roller tracks having a cross sectional shape defining side walls and a floor portion therebetween, which roller tracks run over the cargo deck; a plurality of conveyor ball units that are attached to the roller tracks; and a plurality of holder frames within each of which one or more ball units can be attached and which can be secured to the roller tracks, the holder frames comprising locking elements for the releasable attachment of the holder frames to the roller tracks.

The roller tracks preferably have a U-shaped cross section and are attached to or on the cargo deck, the ball units being attached to the roller tracks. Hence, in the invention the ball units are fixed within holder frames that can be manipulated as separate units and releasably fixed to the roller tracks by means of locking elements. This measure enables simple assembly and disassembly even when there is a high density of ball units.

Preferably, the holder frames are constructed with box-shaped cross sections, as a result of which the arrangement is especially stable and stiff with a high loading capacity—in particular in comparison to plate-shaped mounting elements for the ball units.

The holder frames are preferably so constructed that the ball units are attached in a cover section thereof and preferably in addition stand upright on a floor of the holder frames. The result is an increased loading capacity of the entire arrangement, in comparison to one with an exclusively hanging arrangement.

The locking elements preferably comprise snap-action latches that are attached to the holder frames and can be locked into engagement apertures on the roller tracks, preferably on the side walls thereof. The reverse arrangement can also be chosen. Hence, during assembly all that is needed is to set a holder frame into the roller track to a depth such that the snap-action latch, which during insertion is pushed back by the side walls of the conveyor, snaps into the engagement aperture, and thus locks the associated holder frame into the conveyor. These latches are preferably constructed as machined parts made of spring steel, which enables a very stable and nevertheless economical manufacture. These band-shaped parts are preferably attached to the holder frames with rivets. In another preferred embodiment the snap-in latches are formed integrally with the holder frame and subsequently machined out of a frame wall, e.g. by milling.

The engagement apertures are preferably formed in side walls of the roller tracks by a milling process, and are preferably spaced at regular intervals, i.e. in a predetermined array. As a result, the ball units or holder frames can be installed very rapidly as desired.

The holder frames preferably comprise access openings through which the latches can be opened with a tool. Such access openings are preferably positioned on the upper surface of the holder frames, so that the latches can be opened from above, e.g. by means of a screwdriver.

The locking elements further comprise, in addition to the snap-action latches that prevent the holder frames being removed from the roller tracks by lifting them out, also pegs or similar catch elements on the conveyors which, after the holder frames have been set into the conveyors, secure the frames against displacement in the direction of the cargo-deck surface. These catch elements or pegs are preferably constructed as steel rods that are installed the floor of the roller tracks and can be inserted into corresponding recesses in the holder frames. The work of assembly is relatively slight, while the stability and load-bearing capacity of such catch elements is very high. A reversed arrangement is also possible.

Preferably a plurality of catch elements is provided at regular array intervals on the roller tracks, such that these array intervals correspond to the intervals in the array of engagement apertures in the side walls of the conveyor, which are engaged by the snap-action latches. Thus when the holder frames are set into the roller tracks, it is ensured that all the locking elements will be in the locked state.

Preferably the roller track and/or the holder frames are/is constructed as extruded profiles (of aluminum), which enables a very stable and economical manufacture.

An embodiment of the invention will now be described by way of example with reference to the accompanying drawings.

BRIEF DESCRIPTION OF THE SEVERAL VIEWS OF THE DRAWINGS

FIG. 2 is a side view of a roller track;

FIG. 5 is an end-face view of the roller track;

FIG. 6 is a plan view of the arrangement shown in FIG. 5; and

FIG. 7 is a plan view of the roller track in the direction of the arrow VII in FIG. 5.

DETAILED DESCRIPTION OF THE INVENTION

Figure 1:
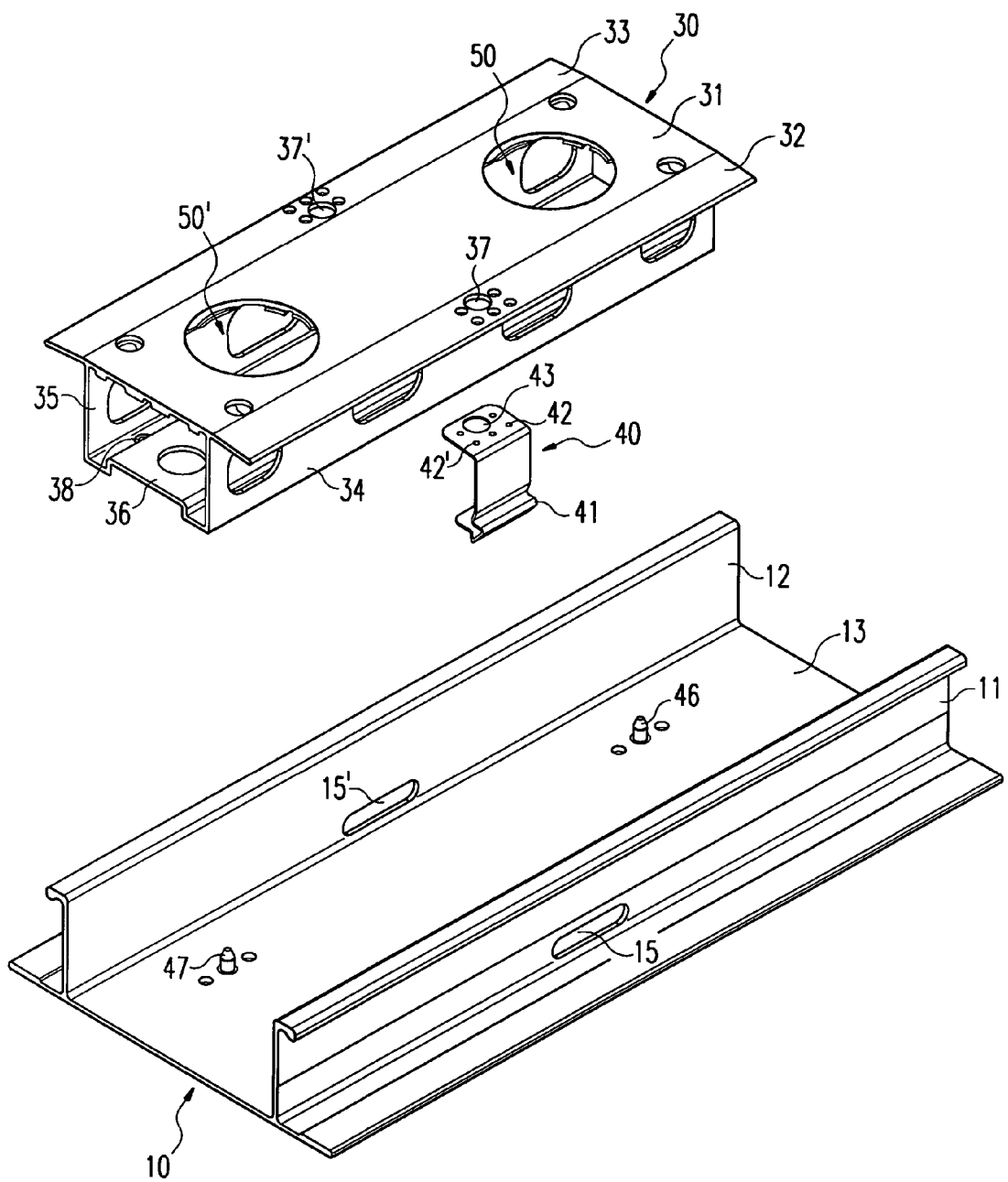
FIG. 1 is a perspective drawing of an apparatus according to the invention when in an un-assembled state.

In the following description, the same reference numerals are used for identical parts or parts with identical actions.

As can be seen in FIG. 1, the conveyor apparatus comprises on one hand a roller track 10, which is attached to the cargo deck (i.e., to floor beams 2) of an aircraft in a manner known per se, by way of its floor 13. From the floor 13 side walls 11, 12 project vertically upward, so that between them it is possible to install, e.g., rollers or roller drive units.

Into the roller track 10 holder frames 30 can be set, which have a box-shaped cross section (see in particular FIGS. 3–5) with a floor 36, side walls 34, 35 and a horizontal mounting section 31 disposed parallel to the floor 36; ramp surfaces 32, 33 slant down from the upper surface of the mounting section along its sides. In the mounting section 31 of the holder frame 30 are disposed openings 50, 50', into which can be inserted the ball units 20, 20' with their housing 22, within which a ball 21 is supported in such a way that it can rotate in all directions. The housing 22 comprises a retaining flange 23, which is held firmly in the mounting section 31, i.e. in the openings 50, 50' provided there. The height of the housing 22 orholder frame 30 is dimensioned such that the housing 22 with its floor 24 is seated on a floor 36 of the holder frame 30, within an opening provided there and formed to correspond to the floor 13. In this way the ball unit 20 with its housing 22 is fixed both within the mounting section 31 and, by way of its floor 24, to the floor 36 of the holder frame 30, as well as being secured by locking devices (not shown) that are known per se. Such ball units have been disclosed in the patents DE-34 21 345 C1 and DE-38 054 94 A1.

Furthermore, the holder frame 30 may be dimensioned with respect to the roller track 10 in such a way that its floor 36 is seated on the floor 13 of the roller track 10. The outer contour of the holder frame 30 is dimensioned such that the outside edges of the ramp surfaces 32, 33 abut against the interior surfaces of the side walls 11, 12 of the roller track 10 at a point below the upper edges of these walls, so that on one hand transverse forces, relative to the lengthwise direction of the roller track 10, can be resisted, whereas on the other hand there is no danger that the bottoms of objects that are being transported could be driven against the sides of the holder frame 30.

To the undersides of the ramp surfaces 32, 33 on the holder frame 30 are attached downwardly projecting snap-action latches 40 made of spring steel and bent to form outwardly directed lugs 41. The dimensions and shape of this structure are such that the lugs 41 are inserted into engagement apertures 15, 15' when a holder frame 30 is set into a roller track 10. These engagement apertures 15, 15' have been milled into the side walls 11, 12 of the roller track 10 at regular intervals, forming an array that allows the holder frames 30 to be placed into the roller track 10 at predetermined positions.

Figure 3:
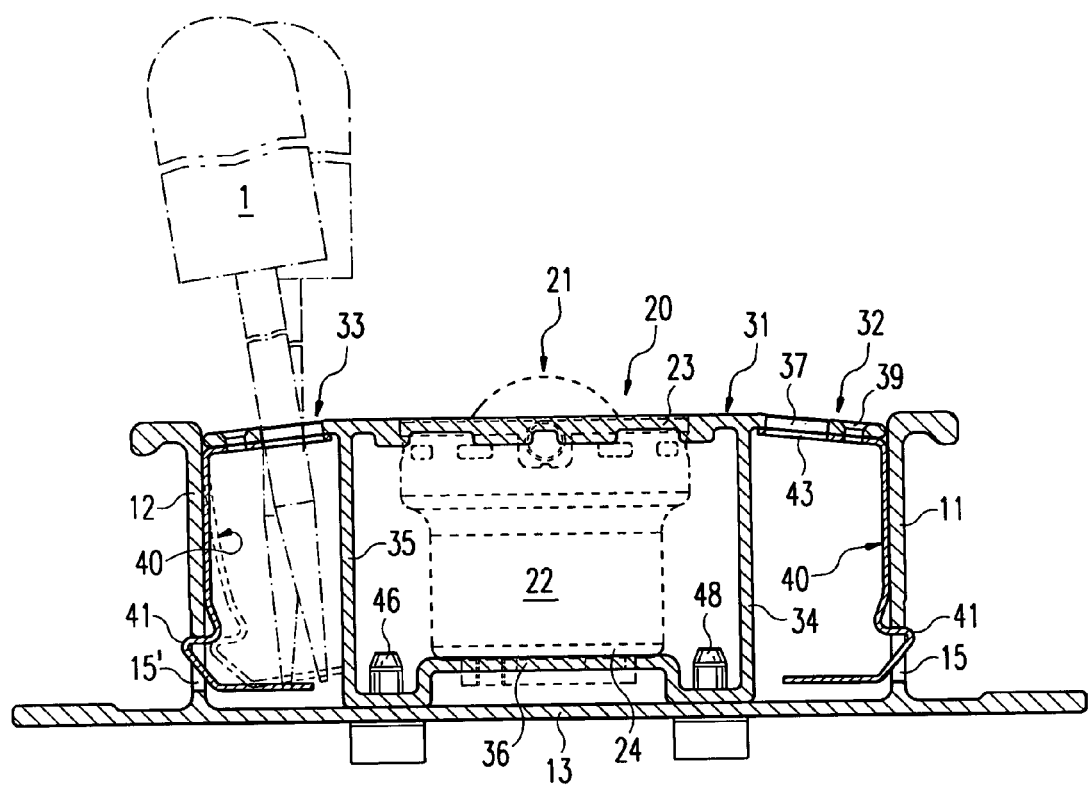
FIG. 3 is a cross-sectional view, taken along the line III—III in FIG. 2, through an assembled arrangement with a tool inserted.
Figure 4:
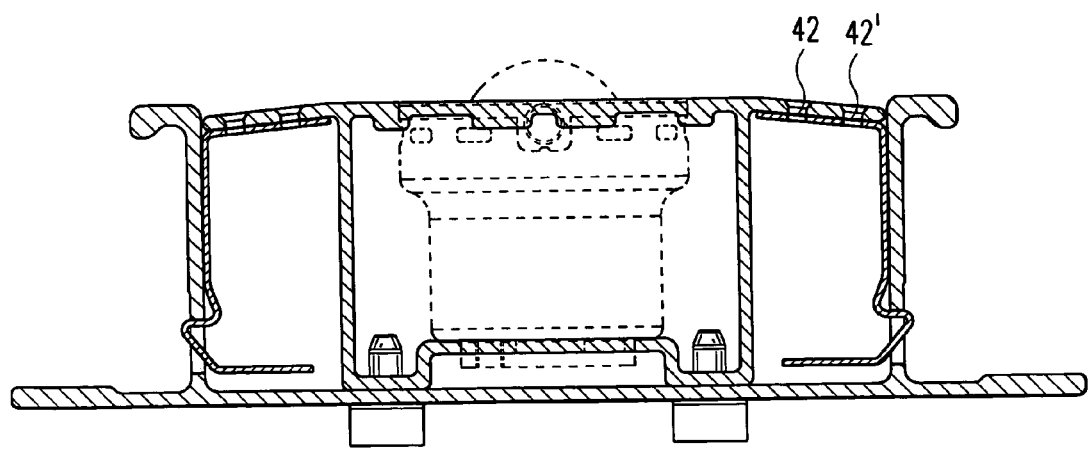
FIG. 4 is a cross-sectional view similar to that of FIG. 3, but without the tool.

The snap-action latches 40 comprise attachment bores 42, 42' and a passage bore 43 at their upper ends, positioned so that they can be aligned with correspondingly disposed attachment bores 39 or access openings 37, 37', respectively, in the holder frame 30 and the latches 40 can be riveted to the holder frame 30. As shown in FIG. 3, a tool 1, in particular a screwdriver, can be inserted through the access openings 37, 37' and passage bores 43 so that the tool can be used to grip the lower end of the latch 40 and bend the latch inward, thus pulling the lug 41 out of the engagement aperture 15 or 15' and as a result allowing the holder frame 30 to be lifted upward, out of the roller track 10. For setting the frame into the track no tool is needed, because during insertion the latches 40 are deflected inward until the lug 41 catches in the engagement aperture 15 or 15'.

On the floor 13 are attached pegs 46 to 49, in particular steel rods, so that they project upward and are disposed at places, usually forming an array, such that they are positioned within apertures 38 in the floor 36 of the holder frame 30 when the snap-action latches 40, i.e. their lugs 41, have become caught in the engagement apertures 15, 15' of the roller track 10. Owing to the engagement of the pegs 46 to 49 with the apertures 38 in the holder frames 30, the frames are fixed in the roller tracks 10 in such a way that horizontal forces in the direction of the surface of the cargo deck on which the roller tracks 10 are mounted are opposed at these places. The latches 40 therefore need to counteract only those forces that tend to raise the holder frames 30 out of the roller track. According to the preferred embodiments shown here, each holder frame 30 is fixed within the roller track 10 by two latches 40 and four pegs 46 to 49.

It can be seen from the above that according to the present invention the ball units 20 are preferably mounted in groups in holder frames 30, so that they can be handled together. The attachment devices to fix the holder frames 30 within the roller track 10 are disposed in an array such that a plurality of holder frames 30 can be installed, preferably closely adjacent to one another to ensure that the ball units 20 are spaced equidistant from one another over relatively long distances. The assembly and disassembly are extremely simple, thus greatly simplifying the repeated reconstruction of the cargo deck that is ordinarily necessary to adapt it for special transport situations as well as to install replacements.

What is claimed is:

1. A conveyor apparatus adapted for use on a cargo deck of an aircraft, comprising:
    roller tracks having a cross sectional shape defining side walls and a floor portion therebetween, which roller tracks run over the cargo deck and are provided for installing rollers and/or latches and/or power drive units;
    a plurality of conveyor ball units; and
    a plurality of holder frames within each of which one or more of the conveyor ball units can be attached and which can be secured to the roller tracks, the holder frames comprising locking elements for the releasable attachment of the holder frames to the roller tracks, the locking elements configured to engage at least one of the side walls of the roller tracks.

2. A conveyor apparatus as claimed in claim 1, wherein the holder frames have a box-shaped cross sectional profile.

3. A conveyor apparatus as claimed in claim 1, wherein the holder frames comprise lid portions to which the ball units are attached.

4. A conveyor apparatus as claimed in claim 1, wherein the holder frames comprise a floor on which the ball units stand.

5. A conveyor apparatus as claimed in claim 1, wherein the locking elements comprise catch elements on the roller tracks by means of which the holder frames, after being set into the roller tracks, are secured against displacement in a direction along the surface of the cargo deck.

6. A conveyor apparatus as claimed in claim 5, wherein the catch elements comprise pegs that are set into the floor portions of the roller tracks and that can be inserted into corresponding apertures defined by the holder frames.

7. A conveyor apparatus as claimed in claim 1, wherein at least one of the roller tracks and the holder frames comprises an extruded profile.

8. A conveyor apparatus adapted for use on a cargo deck of an aircraft, comprising
- roller tracks having a cross sectional shape defining side walls and a floor portion therebetween, which roller tracks run over the cargo deck;
- a plurality of conveyor ball units; and
- a plurality of holder frames within each of which one or more ball units can be attached and which can be secured to the roller tracks, the holder frames comprising locking elements for the releasable attachment of the holder frames to the roller tracks, wherein the roller tracks define engagement apertures and the locking elements comprise snap-action latches that are attached to the holder frames and that can be caught in the engagement apertures of the roller tracks.

9. A conveyor apparatus as claimed in claim 8, wherein the roller tracks define the engagement apertures in at least one of their side walls.

10. A conveyor apparatus as claimed in claim 8, wherein the engagement apertures are disposed at regular intervals.

11. A conveyor apparatus as claimed in claim 8, wherein the holder frames define access openings through which the snap-action latches can be opened by means of a tool.

12. A conveyor apparatus as claimed in claim 10, wherein a plurality of catch elements, which are spaced apart at regular intervals, are provided on the roller tracks.

* * * * *